United States Patent [19]

Klomp

[11] Patent Number: 4,776,516
[45] Date of Patent: Oct. 11, 1988

[54] AIR-ASSIST FUEL INJECTION NOZZLE

[75] Inventor: Edward D. Klomp, Mount Clemens, Mich.

[73] Assignee: General Motors Corporation, Detroit, Mich.

[21] Appl. No.: 106,402

[22] Filed: Oct. 9, 1987

[51] Int. Cl.$^4$ .................. F02M 49/02; F02M 45/10; F02M 41/16; B05B 1/30

[52] U.S. Cl. ........................................ 239/87; 239/91; 239/95; 239/96; 239/533.14

[58] Field of Search .................... 239/87–91, 239/95, 96, 533.3–533.6, 533.9–533.12, 533.14

[56] References Cited

U.S. PATENT DOCUMENTS

| | | | |
|---|---|---|---|
| 1,589,247 | 6/1926 | Scott | 239/533.9 |
| 2,714,853 | 8/1955 | Schlamann | 239/95 X |
| 2,872,247 | 2/1959 | Shallenberg | 239/95 X |
| 2,984,230 | 5/1961 | Cummins | 239/88 X |
| 3,632,047 | 1/1972 | Ghougasian | 239/533.12 |
| 4,693,420 | 9/1987 | Klomp | 239/87 |

OTHER PUBLICATIONS

ASME publication entitled "The PT-ECON—A New Injector Concept for the D.I. Diesel to Improve Smoke and Fuel Consumption at Low Emission Levels", presented Apr., 1976.

Letter by K. L. Hulsing, subject: "Cummins New PT-ECON Fuel Injector", dated May 21, 1975.

Primary Examiner—Andres Kashnikow
Assistant Examiner—Patrick N. Burkhart
Attorney, Agent, or Firm—Arthur N. Krein

[57] ABSTRACT

An air-assist fuel injection nozzle has an externally actuated plunger journaled for axial movement in the cylinder provided in a nozzle body. The plunger tip contains a central stepped bore which slidably supports a spring bias injection needle valve therein. The plunger, when it is in a raised position, allows a valve controlled supply passage to deliver a metered quantity of liquid fuel into a chamber defined by the cylinder and the valve and of the plunger. The cylinder at the chamber end is closeable by a gas valve disk which in turn has a central aperture defining a discharge passage flow through which is controlled by the inward opening injection needle valve.

1 Claim, 1 Drawing Sheet

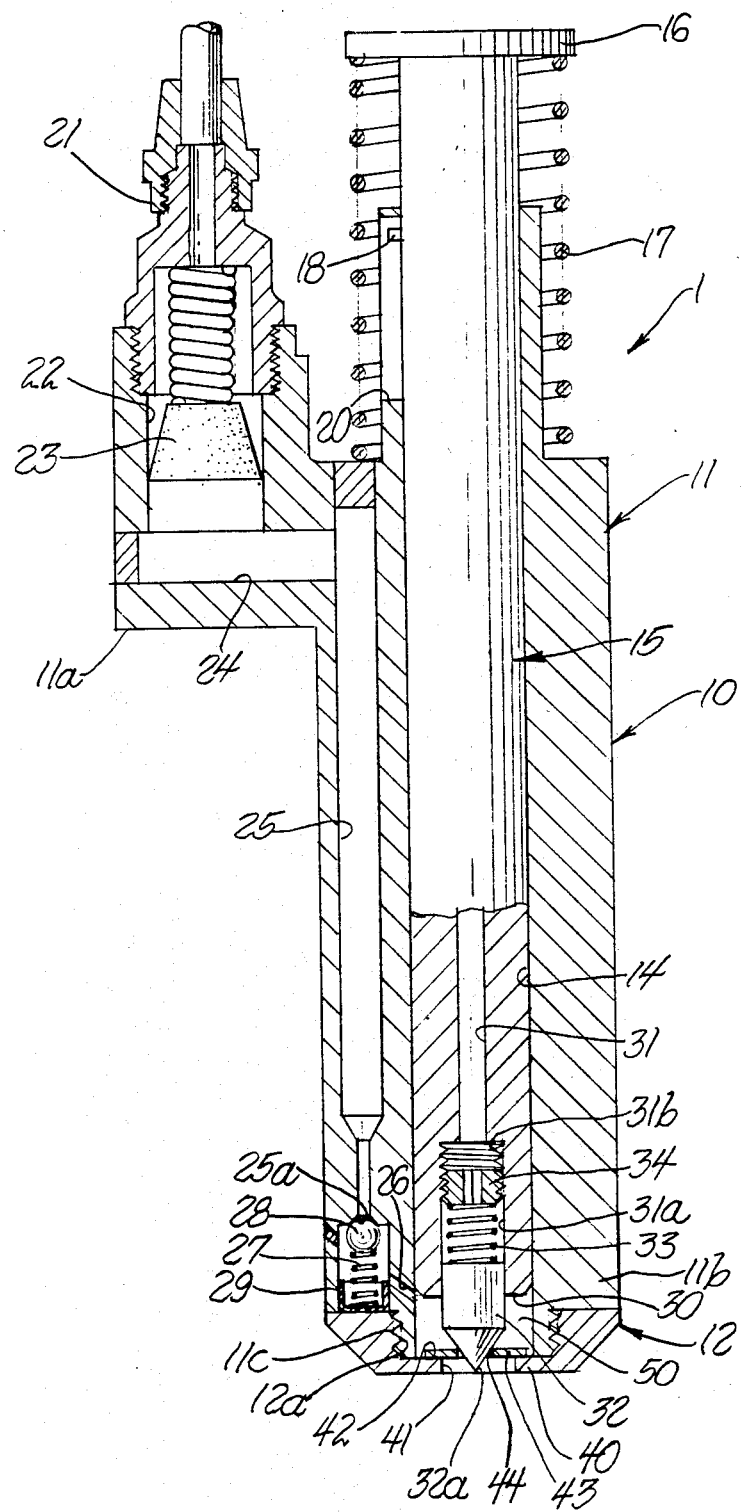

AIR-ASSIST FUEL INJECTION NOZZLE

FIELD OF THE INVENTION

This invention relates to fuel injection nozzles as used for the direct injection of a charge of fuel into the combustion chamber of an engine and, in particular, to an air-assist fuel injection nozzle.

DESCRIPTION OF THE PRIOR ART

The desirability of mixing an aeriform fluid with fuel during an injection cycle into the combustion chamber of an engine has long been recognized as a means, for example, to reduce emission problems. For example, in direct injection of fuel into diesel engines, because of the pressures involved, such mixing of an aeriform fluid has normally been accomplished by a so-called air assist fuel injection nozzle of the type disclosed, for example, in U.S. Pat. No. 2,984,230 issued May 16, 1961 to Clessie L. Cummins or in applicant's copending U.S. patent application Ser. No. 900,093 filed Aug. 25, 1987, now U.S. Pat. No. 4,693,420 assigned to a common assignee. Such air-assist fuel injection nozzles normally include an externally cam actuated, needle plunger reciprocably journaled in a cylinder provided in an injection nozzle body so as to define a variable volume pump chamber which is supplied during, what may be referred to as, a suction stroke of the plunger with a predetermined metered quantity of fuel into the pump chamber. Also after an injection cycle, as the needle plunger is retracted on its suction stroke, aeriform fluid, including exhaust gases, from the combustion chamber can flow, via discharge passage means, into the pump chamber so as to mix with the charge of metered fuel flowing into the pump chamber, and to specifically mix with this fuel during the next pump stroke of the needle plunger so that this aeriform fluid and fuel are pressurized whereby it can be discharged through the discharge passage means at the spray tip end of the injection nozzle body. Thus the term air-assist fuel injection nozzle for this type of fuel injector.

SUMMARY OF THE INVENTION

This invention relates to an air-assist fuel injection nozzle for the direct injection of a charge of fuel and air into an associate combustion chamber in an internal combustion engine, the injection nozzle including an externally cam actuated plunger reciprocably journaled in a cylinder bore in a injector body having at least a valve controlled inlet passage means opening at one end into the bore at a predetermined axial extent and which is connectable at its opposite end to rceive a predetermined metered quantity of fuel. The plunger at its lower end carries a spring biased needle valve. A centrally apertured, hollow, valve seat nut is secured to the lower open end of the injector body and has a gas valve disk movable therein. The gas valve disk is provided with a central aperture sized to receive the needle valve. The needle valve is normally biased by the spring into a position blocking flow through the aperture in the gas valve disk and at the same time this needle valve is also operative to bias the gas valve disk into seating engagement within the valve seat nut so as to normally prevent gas flow into or out of the valve seat nut.

It is therefore a primary object of this invention to provide an improved air-assist fuel injection nozzle wherein the externally actuated plunger of the nozzle assembly, slidable in a bushing, is provided with a through stepped bore so as to slidably support a spring biased needle valve, the pump chamber end of the bushing being partly closed by a hollow valve seat nut which internally thereof defines a valve seat for a gas valve disk positioned in the valve seat nut, with the gas valve disk being provided with a central aperture defining a discharge passage with flow therethrough controlled by the needle valve which, as biased by its spring, normally biased the gas valve disk into seating engagement against the valve seat.

For a better understanding of the invention as well as other objects and further features thereof, reference is had to the following detailed description of the invention to be read in connection with the accompanying drawing.

BRIEF DESCRIPTION OF THE DRAWING

The drawing is of a longitudinal sectional view of an air-assist fuel injection nozzle in accordance with the invention, with the plunger and needle valve thereof shown partly in elevation and with the plunger in its fully retracted or maximum lift position.

Referring now to the drawing, the air-assist fuel injection nozzle, generally designated 1, is adapted to be used to inject fuel into an associate combustion chamber of an internal combustion engine of the type wherein the combustion chamber is defined by a cylinder having a piston reciprocably journaled therein, with this piston being operatively connected to the crankshaft of the engine, none of these engine elements being shown, since they are conventionally known in the art and thus form no part of the subject invention.

In accordance with the invention and in the construction shown, the air-assist fuel injection nozzle 1 includes, for ease of manufacture and assembly, a two-part nozzle body means 10 that includes a tubular main nozzle body 11 with an integral side extension portion 11a and an injector nozzle tip in the form of a hollow, valve seat nut 12 that is suitably secured, as in a manner to be described, to the lower reduced diameter spray tip end 11b of the main nozzle body 11. Thus in the construction illustrated, the spray tip end 11b of the nozzle body at its free end is provided with external threads 11c for mating engagement with the internal threads 12a on the injector nozzle tip or valve seat nut 12. It will be apparent that after assembly of the injection nozzle 1 as shown, the valve seat nut 12 and the nozzle body 11 can be secured together, as by electron or laser beam welding, so as to prevent rotation of the valve seat nut 12 after assembly.

As shown, the main nozzle body 11 is provided with an axial through bore to define a bushing 14 to slidably receive a tubular plunger 15. The plunger 15 and bushing 14 thus define a pump or variable volume chamber 50. The upper end of the plunger 15 is provided with a radial flanged follower 16 whereby it can be actuated in a downward direction against the biasing force of a plunger return spring 17 in a conventional manner, as by an engine driven cam, not shown, having a predetermined cam lobe profile for a purpose to be described hereinafter.

A conventional guide pin 18 fixed to the plunger 15 rides in a guide slot 20 in the upper portion of the main nozzle body 11 to effect angular location of the plunger and to limit its upward travel.

In the construction shown, a fuel line connector 21 is threadingly connected to the internally threaded vertical fuel inlet passage 22 in side extension portion 11a which also contains a fuel filter 23 retained in a conventional manner well known in the art. The lower end of passage 22 connects with one end of a radial passage 24, the opposite end of which connects with a vertical stepped supply passage 25 that extends parallel to the axis of the bushing 14 so as to connect adjacent to its lower end with an inclined radial supply passage 26 opening through the wall defining the bushing 14 at a predetermined axial location. Flow communication between the supply passage 25 and radial supply passage 26 is controlled by a one-way check valve in the form of a spring 27 biased ball valve 28 adapted to seat against a valve seat 25a formed by the internal radial wall defining a part of the reduced diameter portion of the supply passage 25. For ease of assembly, the lower end of the spring 27 is loosely received in a cup-shaped, apertured spring retainer 29.

Now in accordance with a feature of the invention, the lower end 30 of the plunger 15 has an axial stepped, partly threaded, through bore 31 defining an enlarged lower wall 31a of predetermined internal diameter extending upward from the free lower end, so as to slidably receive the stem of a needle valve 32. As shown, the needle valve 32 is normally biased axially outward relative to plunger 15 by a valve spring 33, of a predetermined force as desired, the valve spring 33 at its upper end abutting against a through socket screw 34 adjustably threaded in the internally threaded portion 31b of bore 31 in plunger 15.

Referring now to the valve seat nut 12, it is partly closed at its lower or outboard end by a web 40 having a central through aperture, of predetermined diameter, defining a passage 41 encircled by a valve seat 42 on its inboard end. A gas valve disk 43 is loosely positioned within the bushing 14 and thus within the valve seat nut 12 for movement between a closed position and an open position relative to valve seat 42 for controlling flow through the passage 41. The gas valve disk 43 is provided with a central aperture defining a discharge passage 44 flow through which is controlled by the conical end 32a of the needle valve 32. The internal diameter of the discharge passage 44, as shown, is substantially smaller than the internal diameter of passage 41.

As shown, these components are arranged so that the needle valve 32 is normally biased by spring 33 to block flow through the discharge passage 44 while at the same time normally biasing the gas valve disk 43 into seating engagement against the valve seat 42.

FUNCTION OPERATION

When the plunger 15 is in the maximum lift position shown in the Figure, it is preferably held in this position by a suitable profile of the operating cam, not shown, and its base circle not shown, so that it stays in this position covering a predetermined crank angle period of an engine crankshaft, not shown, including some of the intake and compression processes. In this position, the plunger 15 defines with the bushing 14 a large clearance variable volume chamber 50. This permits the charging of the injector clearance chamber 50 first with liquid fuel, as supplied, in a known manner from a suitable distributor type fuel pump, not shown, via the passages 22, 24, 25, and 26, as during the time a fresh air charge is entering the associate engine combustion chamber, not shown. As air is compressed in the associate engine combustion chamber, not shown, the hot compressed gases from this associate combustion chamber can then exert pressure against the exposed area of the gas valve disk 43 which will then open at a pressure determined in part by the bias force of spring 33 so that these aeriform fluids or gases can then flow through passage 41 into the chamber 50. Energy from this hot aeriform fluid or gases are then used to initiate vaporization of some of the liquid fuel previously supplied, as described above.

It will be apparent that when the plunger 15 is in the position shown in the Figure, compressed gases cannot enter the fuel supply line 25 because of the check valve 28.

Thereafter, when the cam, not shown, initiates downward motion of the plunger 15, plunger 15 will start to compress the trapped charge of fuel and aeriform fluid with this compressed gas/fuel mixture exerting pressure on the gas valve disk 43 forcing it into positive seating engagement against the valve seat 42. As the mixture is further compressed to effect opening movement of the injector needle valve 32. The pressure required to effect opening of the injector needle valve 32 will depend on the preselected bias force of the spring 33 and the pressure in the combustion chamber, not shown, acting on the exposed portion of the conical tip 32a of the injector needle valve 32. Opening of the injector needle valve 32 will then permit injection of the charge of gas and fuel contained in chamber 50 into the combustion chamber, not shown. It should be appreciated that during this downward movement of the plunger 15, the liquid fuel charge and the aeriform fluid or gases in chamber 50 will mix and both will be compressed, with the aeriform fluid or gases then also consisting of vaporized fuel. As will be apparent, the injector needle valve 32 will remain open until the pressure in chamber 50 is reduced due to injection to a value which will then allow the spring 33 to again bias this valve to its valve closed position.

Preferably, during the combustion and expansion processes which will then occur in the associate combustion chamber, not shown, the plunger 15 should remain in the seated or down position until the blowdown process is completed. As the plunger 15 returns on its suction stroke to the starting position, the position shown in the Figure, any unburned hydrocarbons very close to the injector 1 will be drawn into the chamber 50 and can thus be prevented from exiting otherwise from the combustion chamber, not shown. This will occur because of the then pressure differential existing across the gas valve disk 43 forcing it to an open position against the bias force of spring 33 acting through the injector needle valve 32.

By appropriate cam control and proper fuel metering timing, loss of a fresh liquid fuel charge from the injection nozzle to the exhaust can be completely eliminated because once the plunger 15 reaches the upward position shown in the Figure, it is held there until the next injection cycle is to be initiated. Thus no fuel loss should occur during the exhaust stroke of the piston, not shown, since the pressure within the chamber 50 will then remain at essentially that in the exhaust system for the engine, not shown.

While the invention has been described with reference to the structure disclosed herein, it is not confined to the specific details set forth, since it is apparent that modifications and changes can be made by those skilled in the art. This application is therefore intended to cover such modifications or changes as may come within the purposes of the improvements or scope of the following claim.

The embodiments of the invention in which an exclusive property or privilege is claimed are defined as follows:

1. An air-assist fuel injection nozzle for use in discharging fuel into an associate combustion chamber of an internal combustion engine, said injection nozzle including a nozzle body means having a body and a hollow, valve seat nut fixed at one end of said body, an axial bore in said body means extending from the opposite end thereof to define a bushing, a plunger reciprocably received in said bushing for movement between a fully raised position and a fully depressed position corresponding to the end of a suction stroke and the end of a pump stroke, respectively, and defining with said bushing a variable volume chamber adjacent to said one end of said body, one end of said plunger extending outward from said opposite end of said nozzle body means so as to be externally actuatable, the opposite end of said plunger having a stepped bore, partly internally threaded, extending axially thereof and of a predetermined internal diameter, a needle valve slidably journaled in said bore, a spring in said plunger normally biasing said needle valve axially outward relative to said plunger, said valve seat nut having a central aperture at one end thereof defining a passage with a valve seat encircling said passage, and a gas valve disk operatively received in said valve seat nut for movement between a closed position and an open position relative to said valve seat, said gas valve disk having a central aperture therethrough defining a discharge, said spring normally biasing said needle valve in position to block flow through said discharge passage and through said needle valve forcing aid gas valve disk to said closed position.

* * * * *